United States Patent
Min et al.

(10) Patent No.: US 12,051,230 B2
(45) Date of Patent: Jul. 30, 2024

(54) ACCELERATED PROCESSING METHOD FOR DEEP LEARNING BASED-PANOPTIC SEGMENTATION USING A RPN SKIP BASED ON COMPLEXITY

(71) Applicant: Korea Electronics Technology Institute, Seongnam-si (KR)

(72) Inventors: Kyoung Won Min, Seongnam-si (KR); Ganzorig Gankhuyag, Seoul (KR); Haeng Seon Son, Seongnam-si (KR); Seon Young Lee, Seoul (KR); Young Bo Shim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 375 days.

(21) Appl. No.: 17/623,067

(22) PCT Filed: Nov. 25, 2020

(86) PCT No.: PCT/KR2020/016768
§ 371 (c)(1),
(2) Date: Dec. 27, 2021

(87) PCT Pub. No.: WO2022/114252
PCT Pub. Date: Jun. 2, 2022

(65) Prior Publication Data
US 2023/0252755 A1    Aug. 10, 2023

(30) Foreign Application Priority Data

Nov. 25, 2020    (KR) .................... 10-2020-0159431

(51) Int. Cl.
*G06V 10/26*    (2022.01)
*G06V 10/50*    (2022.01)

(52) U.S. Cl.
CPC ............ *G06V 10/267* (2022.01); *G06V 10/50* (2022.01)

(58) Field of Classification Search
CPC .... G06V 10/267; G06V 10/50; G06V 10/806; G06V 10/764; G06V 10/82; G06N 3/063;
(Continued)

(56) References Cited

U.S. PATENT DOCUMENTS

| | | | |
|---|---|---|---|
| 11,410,315 B2* | 8/2022 | Homayounfar | ...... G06V 10/764 |
| 2019/0332897 A1* | 10/2019 | Chen | ...... G06T 7/215 |
| 2020/0167601 A1* | 5/2020 | Deng | ...... G06V 10/764 |

FOREIGN PATENT DOCUMENTS

| | | | | |
|---|---|---|---|---|
| CN | 109543634 A | * | 3/2019 | ...... G06K 9/0063 |
| KR | 10-2020-0007084 A | | 1/2020 | |

OTHER PUBLICATIONS

Liu, Huanyu, Chao Peng, Changqian Yu, Jingbo Wang, Xu Liu, Gang Yu, and Wei Jiang. "An end-to-end network for panoptic segmentation." In Proceedings of the IEEE/CVF conference on computer vision and pattern recognition, pp. 6172-6181. 2019. (Year: 2019).*

(Continued)

*Primary Examiner* — Carol Wang
(74) *Attorney, Agent, or Firm* — NSIP Law (57) ABSTRACT

Provided is a deep learning-based panoptic segmentation accelerated processing technique using a complexity-based RPN skip method. An image segmentation system includes: a first processing unit configured to extract dynamic objects in an instance segmentation method by using an extracted feature; a calculation unit configured to control to skip some areas of the feature extracted at the network by the first processing unit, on the basis of complexity of the input image; a second processing unit configured to extract static objects in a semantic segmentation method by using the feature extracted at the network; and a fusion unit configured to fuse a result of extracting by the first processing unit and a result of extracting by the second processing unit. Accordingly, the panoptic segmentation method can be easily performed even in an embedded environment by reducing complexity for panoptic segmentation processing by reducing a calculation burden.

12 Claims, 5 Drawing Sheets

(58) Field of Classification Search
CPC . G06N 3/08; G06N 20/00; G06T 5/40; G06T 5/50; G06T 7/10; G06T 7/11
See application file for complete search history.

(56) References Cited

OTHER PUBLICATIONS

Francis, Maduakor Ugochukwu . "Fast and Accurate Feature-based Region Identification." PhD diss., 2019. (Year: 2019).*
Zhang, Lu, Zhe Lin, Jianming Zhang, Huchuan Lu, and You He. "Fast video object segmentation via dynamic targeting network." In Proceedings of the IEEE/CVF International Conference on Computer Vision, pp. 5582-5591. 2019. (Year: 2019).*
Schumann, Ole, Jakob Lombacher, Markus Hahn, Christian Wöhler, and Jürgen Dickmann. "Scene understanding with automotive radar." IEEE Transactions on Intelligent Vehicles 5, No. 2 (2019): 188-203. (Year: 2019).*
Xiong, Yuwen, et al. "Upsnet: A Unified Panoptic Segmentation Network." *Proceedings of the IEEE/CVF Conference on Computer Vision and Pattern Recognition*. 2019. (9 pages in English).
Korea Office Action issued on Jun. 2, 2021 in counterpart Korean Patent Application No. 10-2020-0159431 (2 pages in English, 4 pages in Korean).

* cited by examiner

ACCELERATED PROCESSING METHOD FOR DEEP LEARNING BASED-PANOPTIC SEGMENTATION USING A RPN SKIP BASED ON COMPLEXITY

CROSS REFERENCE TO RELATED APPLICATIONS

This application is a U.S. National Stage Application of International Application No. PCT/KR2020/016768, filed on Nov. 25, 2020, which claims the benefit under 35 USC 119(a) and 365(b) of Korean Patent Application No. 10-2020-0159431, filed on Nov. 25, 2020, in the Korean Intellectual Property Office, the entire disclosure of which is incorporated herein by reference for all purposes.

TECHNICAL FIELD

The present disclosure relates to image processing technology, and more particularly, to a region proposal network (RPN) acceleration method of image complexity-based instance segmentation for panoptic segmentation.

BACKGROUND ART

Panoptic segmentation refers to a technique for separating various objects from a scene and labeling the objects. Since panoptic segmentation is a kind of artificial intelligence (AI) processing, it requires a large amount of calculation.

Accordingly, there may be a problem that it is difficult to perform panoptic segmentation in an embedded system having limited resources, and there is a need for solving this problem.

DISCLOSURE

Technical Problem

The present disclosure has been developed in order to address the above-discussed deficiencies of the prior art, and an object of the present disclosure is to provide a method for easily performing panoptic segmentation, which is a kind of AI processing, even in an embedded system having restricted resources, by using an RPN skip method in processing the panoptic segmentation.

Another object of the present disclosure is to provide a method and an apparatus for reducing a calculation burden to accelerate an RPN of panoptic segmentation, by calculating image complexity and skipping the RPN in an unnecessary area.

Technical Solution

According to an embodiment of the present disclosure to achieve the above-described objects, an image segmentation system includes: a network configured to extract a feature from an input image; a first processing unit configured to extract dynamic objects in an instance segmentation method by using the feature extracted at the network; a calculation unit configured to control to skip some areas of the feature extracted at the network by the first processing unit, on the basis of complexity of the input image; a second processing unit configured to extract static objects in a semantic segmentation method by using the feature extracted at the network; and a fusion unit configured to fuse a result of extracting by the first processing unit and a result of extracting by the second processing unit.

The calculation unit may calculate the complexity of the input image by using a histogram of the input image and the result of extracting by the second processing unit.

The complexity based on the histogram of the input image may be calculated through the following equation:

$$H = \text{Histogram}(\text{Image})$$

$$\text{HistogramComplexity} = (\text{var}(H))/M$$

where Image is an input image, HistogramComplexity is complexity based on the histogram of the input image, var(H) is a variance of H, and M is a histogram total bin value.

The complexity based on the result of extracting by the second processing unit may be calculated through the following equation:

$$\text{SegComplexity} = X\text{thing}/(X\text{stuff} + X\text{thing})$$

wherein SegComplexity is complexity based on the result of extracting by the second processing unit, Xthing is an area that is extracted as a thing (dynamic object) by the second processing unit, and Xstuff is an area that is extracted as a stuff (static object) by the second processing unit.

The calculation unit may calculate the complexity of the input image through the following equation:

$$\text{ImgComplexity} = a \times \text{HistogramComplexity} + b \times \text{SegComplexity}$$

where ImgComplexity is complexity of the input image, and a and b are weighting coefficient parameters.

When the complexity is a first level, the calculation unit may control not to perform an area skip, and, when the complexity is lower than the first level, the calculation unit may control to perform the area skip with respect to an area that does not correspond to an Xthing area.

When the complexity is a second level lower than the first level, the calculation unit may control to process by scaling the Xthing area, and, when the complexity is a third level lower than the second level, the calculation unit may control to process without scaling the Xthing area.

According to another embodiment of the present disclosure, an image segmentation method includes: a first processing step of extracting dynamic objects in an instance segmentation method by using a feature extracted at a network which extracts a feature from an input image; a step of controlling to skip some areas of the feature extracted at the network at the first processing step, on the basis of complexity of the input image; a second processing step of extracting static objects in a semantic segmentation method by using the feature extracted at the network; and a fusion step of fusing a result of extracting at the first processing step and a result of extracting at the second processing step.

Advantageous Effects

According to embodiments of the present disclosure as described above, complexity can be effectively reduced by reducing the number of anchor boxes generated at the RPN through RPN-skip.

In addition, according to embodiments of the present disclosure, the panoptic segmentation method can be easily performed even in an embedded environment by reducing complexity for panoptic segmentation processing by reducing a calculation burden.

In addition, the RPN-skip method suggested in embodiments of the present disclosure can be easily modified and can be equally applied to a fusion algorithm that processes by fusing bounding box-based object detection and semantic segmentation, as well as the panoptic segmentation processing method which processes by fusing instant segmentation and semantic segmentation.

BEST MODE

Hereinafter, the present disclosure will be described in more detail with reference to the drawings.

Figure 1:
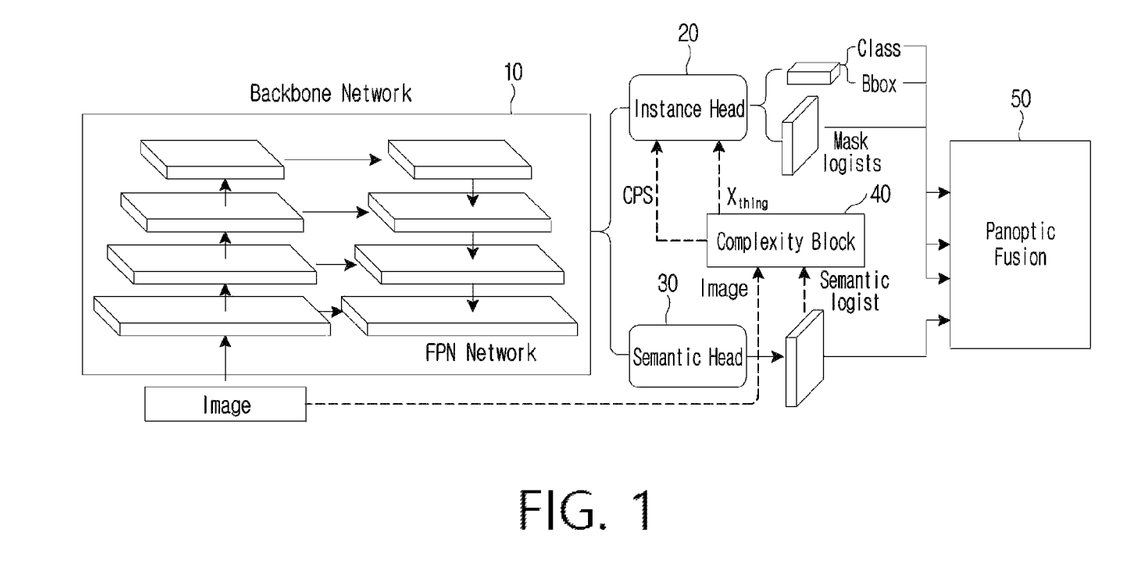
FIG. 1 is a view illustrating a configuration of a panoptic segmentation accelerated processing system according to an embodiment of the present disclosure.

FIG. 1 is a view illustrating a configuration of a panoptic segmentation accelerated processing system according to an embodiment of the present disclosure.

Panoptic segmentation divides a scene into a thing or a stuff and labels all pixels. The thing class refers to a dynamic object (class) such as cars, persons, etc., and the stuff class refers to a static object (semantic class) such as sky, road, building, etc.

As shown in FIG. 1, the panoptic segmentation includes an FPN network 10, an instant head 20 which functions as an instant segmentation processing unit, a semantic head 30 which functions as a semantic segmentation processing unit, a complexity block 40 which functions as a complexity calculation unit, and a panoptic fusion 50 which functions as a panoptic fusion unit.

The instant head 20 is configured to extract a thing class, and extracts a result of processing in the form of mask logistics, class, bounding box by using an instance segmentation method.

The semantic head 30 is configured to extract a stuff class, and extracts semantic logistics by using a semantic segmentation method.

The panoptic fusion 50 extracts a result of panoptic segmentation by fusing the result of instance segmentation of the instant head 20, and the result of semantic segmentation of the semantic head 30.

The panoptic segmentation uses the feature pyramid network (FPN) network 10 as a backbone network for extracting features from an input image, and the FPN network 10 has an advantage of being used in the semantic segmentation and the instance segmentation simultaneously.

Figure 2:
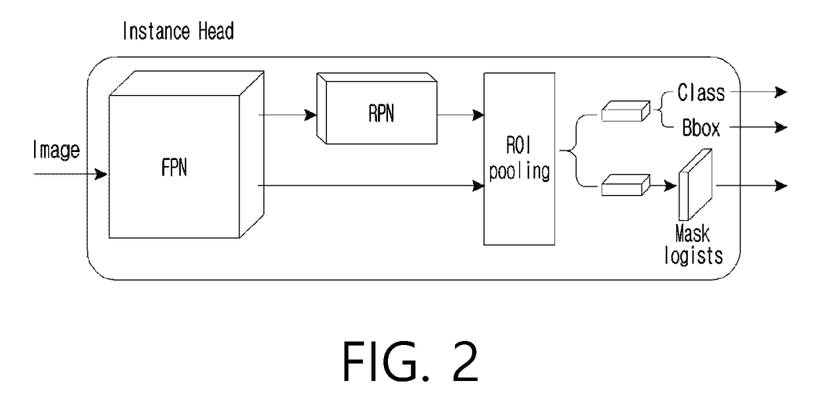
FIG. 2 is a view illustrating a method based on a 2-stage mask-RCNN in instance segmentation.

In the panoptic segmentation processing method, a semantic segmentation method may extract in the FPN through convolution calculation and up-sampling, and instance segmentation uses a 2-stage instance segmentation method as shown in FIG. 2.

FIG. 2 is a view provided to explain a method based on a 2-stage mask-RCNN in instance segmentation.

The operating method selects a candidate ROI from a region proposal network (RPN) network, and selects an ROI feature through ROI pooling based on the selected ROI.

Next, the method extracts an object class, a bounding box, mask logistics on the basis of the selected ROI feature.

Figure 3:
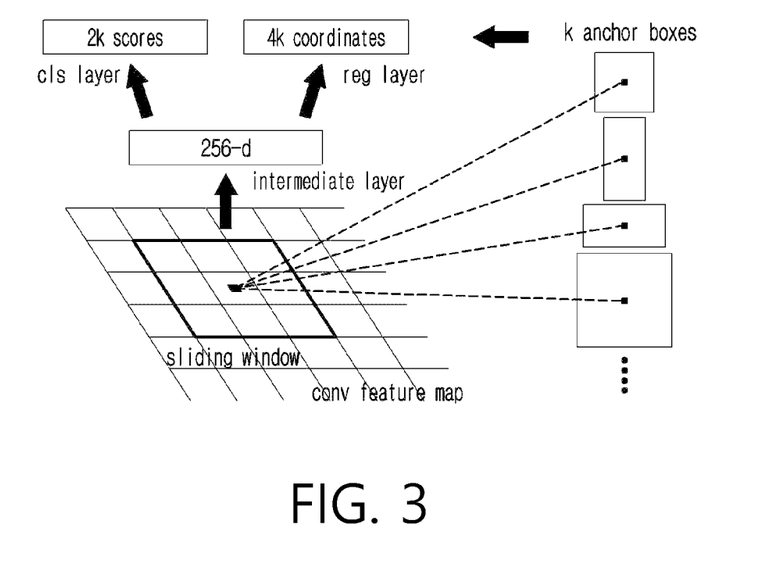
FIG. 3 is a view illustrating a process of generating an anchor box in an RPN.

As shown in FIG. 3, in the RPN, respective center points are selected from an input feature through a sliding window, k number of anchor boxes are made at every center point, a final ROI candidate is selected, and then, a class, a Bbox, a mask are extracted on the basis of the candidate ROI, and then, final best class, best Bbox, best mask logistics are extracted through a non-maximum suppression (NMS) method.

That is, in the RPN, a center point is selected through the sliding window, and k anchor boxes are generated on the basis of the corresponding center point.

The complexity block 40 calculates image complexity by using an input image and a resulting value of the semantic segmentation, and the instance head 20 performs a center point skip in the RPN on the basis of the calculated image complexity in order to accelerate calculation processing.

Figure 4:
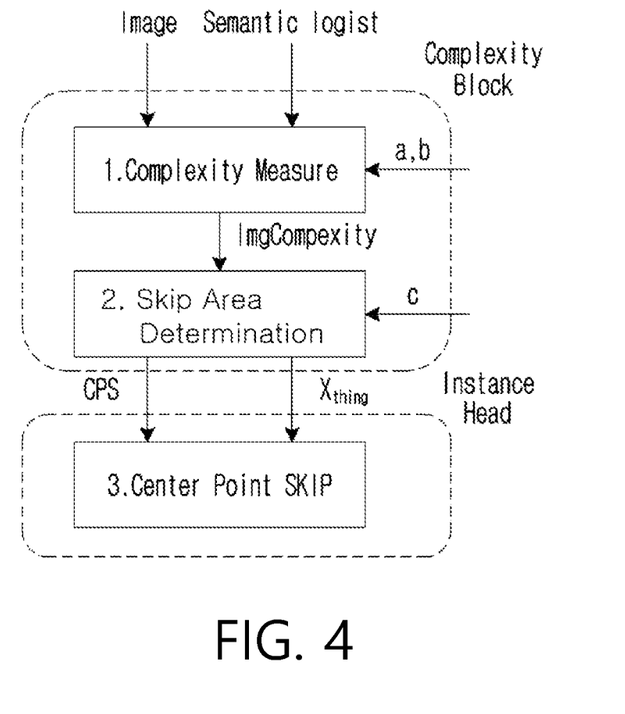
FIG. 4 is a view illustrating a center point skip method.

The center point skip method for performing accelerated processing of panoptic segmentation is divided into 3 steps as shown in FIG. 4. Specifically, a complexity measure is performed by using an input image and semantic logistic which is a result of semantic segmentation, and a skip area is determined in the complexity block 40, and finally, it is determined whether the center point skip is performed by using CPS information and Xthing information which are an output from a skip area determination block. A calculation process of each function block in FIG. 4 will be described hereinbelow.

(1) Complexity Measure

A complexity measure block calculates complexity of an image. The complexity of the image is calculated on the basis of histogram information of the input image and feature information (semantic logistic) outputted from the semantic segmentation.

The complexity measure method will be described hereinbelow in more detail.

First, in order to calculate complexity based on a histogram, the method calculates a histogram of the input image for performing panoptic segmentation as shown in the following equation 1, and calculates complexity by calculating a variance of the histogram.

$$H = \text{Histogram(Image)}$$

$$\text{HistogramComplexity} = (\text{var}(H))/M \qquad \text{Equation 1}$$

Herein, M is a histogram total bin value.

Next, in order to calculate complexity based on a semantic feature, the method divides the semantic logistic, which is feature information derived as a result of processing semantic segmentation, into Xthing indicating an area corresponding to a thing regarding the entire input image, and a stuff (Xstuff) indicating the other area, and measures SegComplexity of the semantic logistic according to the following ratio:

$$\text{SegComplexity} = X\text{thing}/(X\text{stuff} + X\text{thing}) \qquad \text{Equation 2}$$

Image complexity which is finally calculated and determined from the above-described information is defined and calculated by the following equation:

$$\text{ImgComplexity} = a \times \text{HisogramComplexity} + b \times \text{SegComplexity} \qquad \text{Equation 3}$$

where a, b are weighting coefficient parameters.

$$a + b = 1 \qquad \text{Equation 4}$$

(2) Skip Area Determination:

The skip area determination block determines a level of image complexity with reference to equation 3, and finally determines a skip method.

In an embodiment of the present disclosure, a skip complexity area is defined by three levels (low, middle, high) as follows, and a skip processing method is determined according to each step. A value of each of the following skip levels is changeable and the respective skip levels may be added or reduced according to a skip strategy.

1) Skip complexity Low: [0, . . . , 0.3]
2) Skip complexity Middle: [0.31, . . . , 0.7]
3) Skip complexity High: [0.71, . . . 1.0]

According to the skip method based on the above-described three levels, it is determined which of the skip complexity levels defined above corresponds to an ImgComplexity value calculated at the complexity measure step, and then, based on the determination, processing of the RPN is determined as follows:

① When the image complexity corresponds to the skip complexity high, an RPN skip is turned off. In this case, CPS=0 (RPN center point SKIP off) may be outputted and RPN processing may be performed.

② When the image complexity corresponds to the skip complexity middle, the Xthing area may be scaled and the RPN skip method may be performed.

That is, CPS=1 (RPN center point SKIP on) may be outputted and the Xthing area may be scaled based on the following equation, and RPN processing may be performed with respect to the scaled area:

$X\text{thing}=\text{Scale}(X\text{thing},c)$, $c$-scale ratio of $X$thing region, $c \geq 1$ ③ When the image complexity is the skip complexity low, the Xthing area is directly used.

That is, CPS=1 (RPN center point SKIP on) may be outputted, and RPN processing may be performed with respect to the entire area without scaling the Xthing area:

$X\text{thing}=X\text{thing}$

3) Center Point Skip Performance:

A center point skip for processing instant segmentation is performed according to a result of calculating complexity. Specifically, when the complexity is the complexity high level, the center point skip is not performed and processing for instant segmentation calculation is performed with respect to all of the center points of the semantic segmentation, and, when the complexity is the complexity low or middle, the center point skip is performed with respect to a portion that does not correspond to the Xthing area.

Figure 5:
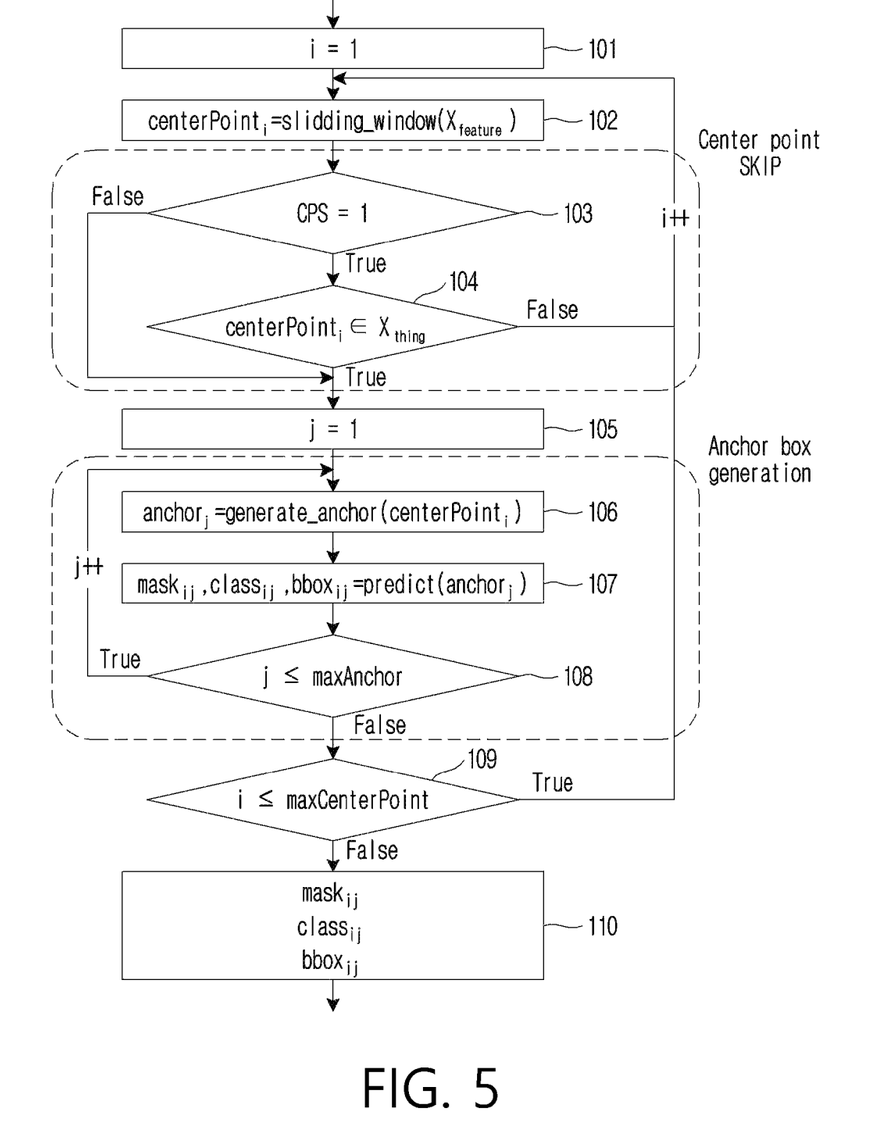
FIG. 5 is a view illustrating a center point skip method.

More specifically, operations of the RPN center point skip method suggested in the embodiments of the present disclosure will be described with reference to the flowchart of FIG. 5.

101: Position information of a center point which has a value of i is initialized.

102: A new center point (centerPoint$_i$) is selected through a sliding_window, based on an extracted feature Xfeature (FPN).

103: A center point skip application method is determined by calculating image complexity in the method described in FIG. 4.

: If FALSE (CPS=0), the center point skip is not applied and the RPN method is applied.

: If TURE (CPS=1), the center point skip is used.

104: It is identified whether centerPoint$_i$ correspond to an Xthing area.

: FALSE: If the centerPoint$_i$ does not correspond to the Xthing area, an area corresponding to the centerPoint$_i$ is skipped and strep 102 resumes.

: TURE: If the centerPoint$_i$ corresponds to the Xthing area, RPN processing is performed in the corresponding area on the basis of the centerPoint$_i$.

105: A number of an anchor box having a value of j is initialized.

106: An anchor box corresponding to the centerPoint$_i$ is generated.

107: mask$_{ij}$, class$_{ij}$, bbox$_{ij}$ are generated on the basis of the generated anchor box.

108: It is identified whether anchor generation is performed with respect to all of the generated anchors.

: If an anchor is generated up to the maxAnchor, step 109 is performed.

: If the anchor is not generated up to the maxAnchor, the next anchor$_j$ corresponding to the centerPoint$_i$ is generated at step 106.

109: It is identified whether the centerPoint$_i$ is generated until the value of i of the centerPoint reaches maxCenterPoint.

: If the centerPoint is generated in all area, step 110 is performed.

: If not, step 102 resumes to generate the next centerPoint through the sliding_window and to increase i.

110: All of mask$_{ij}$, class$_{ij}$, bbox$_{ij}$ selected in the RPN are delivered to the next step.

Up to now, the deep learning-based panoptic segmentation acceleration method using the complexity-based RPN skip method has been described with reference to preferred embodiments.

In embodiments of the present disclosure, in order to accelerate an RPN of image complexity-based instance segmentation for panoptic segmentation, image complexity of a semantic segmentation processing unit is measured, first, without selecting a center point through a sliding window in all areas for processing the RPN of an instance segmentation performance unit, which is one of the elements constituting the panoptic segmentation, and a portion corresponding to an unnecessary area in the instant segmentation processing process is not calculated and calculation is skipped. To this end, the RPN is accelerated.

The number of anchor boxes generated in the RPN is reduced through the RPN-skip method, and complexity for panoptic segmentation processing is reduced by reducing a calculation burden, so that the panoptic segmentation method can be easily performed in an embedded environment.

In addition, the RPN-skip method suggested above can be easily modified and can be equally applied to a fusion algorithm that processes by fusing bounding box-based object detection and semantic segmentation, as well as the panoptic segmentation processing method which processes by fusing the instant segmentation and the semantic segmentation as described above.

Figure 6:
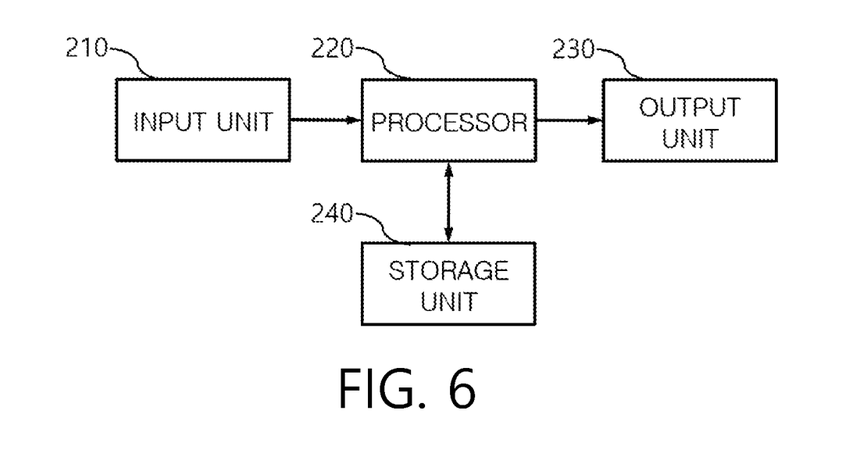
FIG. 6 is a view illustrating a hardware configuration of a panoptic segmentation accelerated processing system according to an embodiment of the present disclosure.

FIG. 6 is a view illustrating a hardware configuration of a panoptic segmentation accelerated processing system according to an embodiment of the present disclosure. The hardware of the panoptic segmentation accelerated processing system includes an input unit 210, a processor 220, an output unit 230, and a storage unit 240 as shown in the drawing.

The input unit 210 receives an input which is a panoptic segmentation target and applies the input to the processor 220. The processor 220 performs the above-described panoptic segmentation processing.

The output unit 230 outputs a result of processing by the processor 220, and the storage 240 provides a storage space necessary for functions and operations of the processor 220.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. An image segmentation system comprising:
one or more processors configured to:
extract a feature from an input image, using a neural network;
perform a first extraction of dynamic objects in an instance segmentation method by using the feature extracted by the neural network;
control to skip some areas of the feature extracted using the neural network in the first extraction, on a basis of complexity of the input image;
perform a second extraction of static objects in a semantic segmentation method by using the feature extracted by the neural network; and
fuse a result of performing the first extraction and a result of performing the second extraction,
wherein the one or more processors are configured to calculate the complexity of the input image by using a histogram of the input image and the result of performing the second extraction.

2. The image segmentation system of claim 1, wherein the complexity based on the histogram of the input image is calculated through the following equation:

$$H = \text{Histogram}(\text{Image})$$

$$\text{HistogramComplexity} = (\text{var}(H))/M$$

where Image is an input image, HistogramComplexity is complexity based on the histogram of the input image, var(H) is a variance of H, and M is a histogram total bin value.

3. The image segmentation system of claim 2, wherein the complexity based on the result of performing the second extraction is calculated through the following equation:

$$\text{SegComplexity} = X\text{thing}/(X\text{stuff} + X\text{thing})$$

wherein SegComplexity is complexity based on the result of performing the second extraction, Xthing is an area that is extracted as a thing (dynamic object) by performing the second extraction, and Xstuff is an area that is extracted as a stuff (static object) by performing the second extraction.

4. The image segmentation system of claim 3, wherein the one or more processors are configured to calculate the complexity of the input image through the following equation:

$$\text{ImgComplexity} = a \times \text{HistogramComplexity} + b \times \text{SegComplexity}$$

where ImgComplexity is complexity of the input image, and a and b are weighting coefficient parameters.

5. The image segmentation system of claim 1, wherein the one or more processors are configured to:
when the complexity is a first level, control not to perform an area skip; and
when the complexity is lower than the first level, control to perform the area skip with respect to an area that does not correspond to an Xthing area.

6. The image segmentation system of claim 5, wherein the one or more processors are configured to:
when the complexity is a second level lower than the first level, control to process by scaling the Xthing area; and
when the complexity is a third level lower than the second level, control to process without scaling the Xthing area.

7. An image segmentation system comprising:
one or more processors configured to:
extract a feature from an input image, using a neural network;
perform a first extraction of dynamic objects in an instance segmentation method by using the feature extracted by the neural network;
control to skip some areas of the feature extracted using the neural network in the first extraction, on a basis of complexity of the input image;
perform a second extraction of static objects in a semantic segmentation method by using the feature extracted by the neural network; and
fuse a result of performing the first extraction and a result of performing the second extraction,
wherein the one or more processors are configured to:
when the complexity is a first level, control not to perform an area skip; and
when the complexity is lower than the first level, control to perform the area skip with respect to an area that does not correspond to an Xthing area.

8. The image segmentation system of claim 7, wherein the one or more processors are configured to:
when the complexity is a second level lower than the first level, control to process by scaling the Xthing area; and
when the complexity is a third level lower than the second level, control to process without scaling the Xthing area.

9. A processor-implemented image segmentation method comprising:
performing first extracting of dynamic objects in an instance segmentation method by using a feature extracted at a network which extracts a feature from an input image;
controlling to skip some areas of the feature extracted at the network at the first processing step, on a basis of complexity of the input image;
performing second extracting of static objects in a semantic segmentation method by using the feature extracted at the network; and fusing a result of performing the first extracting and a result of performing the second extracting,
wherein the method further comprises calculating the complexity of the input image by using a histogram of the input image and the result of performing the second extracting.

10. The method of claim 9, wherein the complexity based on the histogram of the input image is calculated through the following equation:

$$H = \text{Histogram}(\text{Image})$$

$$\text{HistogramComplexity} = (\text{var}(H))/M$$

where Image is an input image, HistogramComplexity is complexity based on the histogram of the input image, var(H) is a variance of H, and M is a histogram total bin value.

11. The method of claim 10, wherein the complexity based on the result of performing the second extracting is calculated through the following equation:

$$\text{SegComplexity} = X\text{thing}/(X\text{stuff} + X\text{thing})$$

wherein SegComplexity is complexity based on the result of performing the second extracting, Xthing is an area that is extracted as a thing (dynamic object) by performing the second extracting, and Xstuff is an area that is extracted as a stuff (static object) by performing the second extracting.

12. The method of claim 11, further comprises calculating the complexity of the input image through the following equation:

$$\text{ImgComplexity} = a \times \text{HistogramComplexity} + b \times \text{SegComplexity}$$

where ImgComplexity is complexity of the input image, and a and b are weighting coefficient parameters.

* * * * *